United States Patent [19]  [11]  4,236,869
Laurello  [45]  Dec. 2, 1980

[54] GAS TURBINE ENGINE HAVING BLEED APPARATUS WITH DYNAMIC PRESSURE RECOVERY

[75] Inventor: Vincent P. Laurello, Guilford, Conn.

[73] Assignee: United Technologies Corporation, Hartford, Conn.

[21] Appl. No.: 864,192

[22] Filed: Dec. 27, 1977

[51] Int. Cl.² .............................................. F01D 5/18
[52] U.S. Cl. .................................... 416/95; 415/115
[58] Field of Search .............. 60/39.66; 415/115, 116, 415/175; 416/90 R, 92, 96 R, 97 R, 95

[56] References Cited

U.S. PATENT DOCUMENTS

| | | | |
|---|---|---|---|
| 2,951,340 | 9/1960 | Howald | 60/39.66 |
| 2,988,325 | 6/1961 | Dawson | 415/115 |
| 3,565,545 | 2/1971 | Bobo et al. | 415/115 |
| 3,768,921 | 10/1973 | Brown et al. | 415/116 |
| 3,791,758 | 2/1974 | Jenkinson | 416/92 |
| 3,826,084 | 7/1974 | Branstrom et al. | 415/144 |
| 3,936,215 | 2/1976 | Hoff | 415/115 |
| 3,980,411 | 8/1976 | Crow | 415/115 |
| 4,113,406 | 9/1978 | Lee et al. | 415/115 |

FOREIGN PATENT DOCUMENTS

| | | | |
|---|---|---|---|
| 962601 | 2/1975 | Canada | 416/97 |
| 659211 | 4/1938 | Fed. Rep. of Germany | 415/115 |
| 909059 | 4/1954 | Fed. Rep. of Germany | 416/92 |
| 1288851 | 2/1969 | Fed. Rep. of Germany | 416/96 |
| 764018 | 12/1956 | United Kingdom | 415/115 |

Primary Examiner—Everette A. Powell, Jr.
Assistant Examiner—A. N. Trausch, III
Attorney, Agent, or Firm—McCormick, Paulding & Huber

[57] ABSTRACT

A gas turbine engine has conduits leading from the compressor to the turbine for bleeding a portion of compressor air through the turbine blades for cooling or other purposes. A radial pump in the conduits formed by a tangential accelerator and a rotating diffuser transmits the air from the non-rotating environment in the engine to the rotating environment of the turbine rotor. The tangential accelerator accelerates the bleed air to a tangential speed higher than that of the rotor, and the radial diffuser is designed to recover the dynamic pressure or relative velocity of the air over the rotor.

7 Claims, 4 Drawing Figures

GAS TURBINE ENGINE HAVING BLEED APPARATUS WITH DYNAMIC PRESSURE RECOVERY

BACKGROUND OF THE INVENTION

The present invention relates to gas turbine engines and, more particularly, relates to apparatus for ducting bleed air from the compressor section of the engine through ventilated blades on the turbine rotor.

In gas turbine engines a fluid working medium such as air is ingested into the compressor section of the engine and is delivered at an elevated pressure to a combustion section where the air combines with fuel in a combustion process. The products of combustion are hot gases which are discharged at high velocity over the blades of rotors in the turbine section where some or most of the dynamic velocity is converted into mechanical power before the gases are exhausted or expelled for propulsion. Power developed from the turbine rotors is utilized to drive the compressor and any associated power-consuming equipment such as an aircraft propeller or an electrical generator.

Since the combustion gases reach elevated temperatures which even the finest metals may not withstand over long periods of time, it is well known to provide apparatus for cooling the turbine blades during engine operation. The typical cooling apparatus bleeds a portion of the air in the flow path through the compressor at pressures which are slightly above the working pressure of the hot gases moving through the turbine blades. The bleed air is conducted through passageways within a non-rotating environment of the engine and are transmitted to the rotating environment of the turbine blades by means of a fluid pump.

U.S. Pat. Nos. 2,988,325 to Dawson, 3,602,605 to Lee, 3,768,921 to Brown et al and 3,936,215 to Hoff show examples of several prior art pumping devices which transmit compressor bleed air from a rotating to a non-rotating environment for cooling blades in the turbine section of the engine.

Since the hot combustion gases in the current state of the art enter the turbine section at approximately 94% of the compressor exit pressure, it is essential that the bleed air be delivered to ventilated turbine blades without substantial pressure loss. Otherwise, the flow of bleed air may be severely restricted or stalled, and the cooling or other function performed by such air will be impaired or lost. The pumping apparatus disclosed in the Brown U.S. Pat. No. 3,768,921 for transferring the bleed air from the rotating to the non-rotating environment attempts to maximize the static pressure developed within the turbine section by producing a free vortex flow in a non-rotating chamber from which the cooling air passes into the turbine rotor and blades. The other patents referenced above direct bleed air in a tangential direction to a series of annular apertures on the rotor without attempting to recover the total static pressure of the bleed air, or any loss of dynamic pressure is minimized by matching the tangential velocity of the air with the rotor speed. Since the maximum tangential velocity yields the minimum coolant temperature, matching the velocity with rotor speed imposes an inherent limitation on the cooling system.

It is a general object of the present invention to obtain the maximum static pressure for bleed air in a turbine rotor by an improved pumping apparatus that transfers the air from nonrotating to rotating environments. It is a further object of the invention to be able to maximize the velocity of tangentially transferred bleed air for a minimum coolant temperature.

SUMMARY OF THE INVENTION

The present invention resides in a gas turbine engine of the type having a compressor section, a combustion section, and a turbine section. A fluid working medium such as air is ingested into the compressor section and directed along a flow path through a compressor into the combustion section. Fuel is combined with the working medium in a combustion process and the hot gases forming the products of combustion are directed from the combustion section at high velocity onto a plurality of turbine blades distributed about the periphery of a rotor in the turbine section.

For cooling and other purposes, a portion of the working medium is bled from the flow path in the compressor section to a first conduit means having a discharge end located adjacent the turbine rotor. At the discharging end, a tangential accelerator discharges the working medium substantially tangentially of an annular region of the rotor and in the direction of rotor rotation. The velocity of the discharged medium is higher than the velocity of the annular rotor region at operating speed so that a relative velocity exists between the discharged medium and the rotor.

Second fluid conduit means is connected with the turbine rotor for rotation with the blades and leads to the turbine blades at the rotor periphery. The second conduit means has inlets oriented or directed generally tangentially of the rotor and positioned adjacent said annular region of the rotor to receive the working medium discharged from the tangential accelerator. The tangentially directed inlets recover the dynamic pressure or relative velocity of the medium and thereby improve the static pressure of the medium in the second conduit means. Complete recovery of the dynamic pressure of the medium affords the largest possible static pressure within the rotating environment of the turbine rotor and, correspondingly, the greatest potential for cooling or other purposes.

DESCRIPTION OF THE PREFERRED EMBODIMENTS

Figure 1:
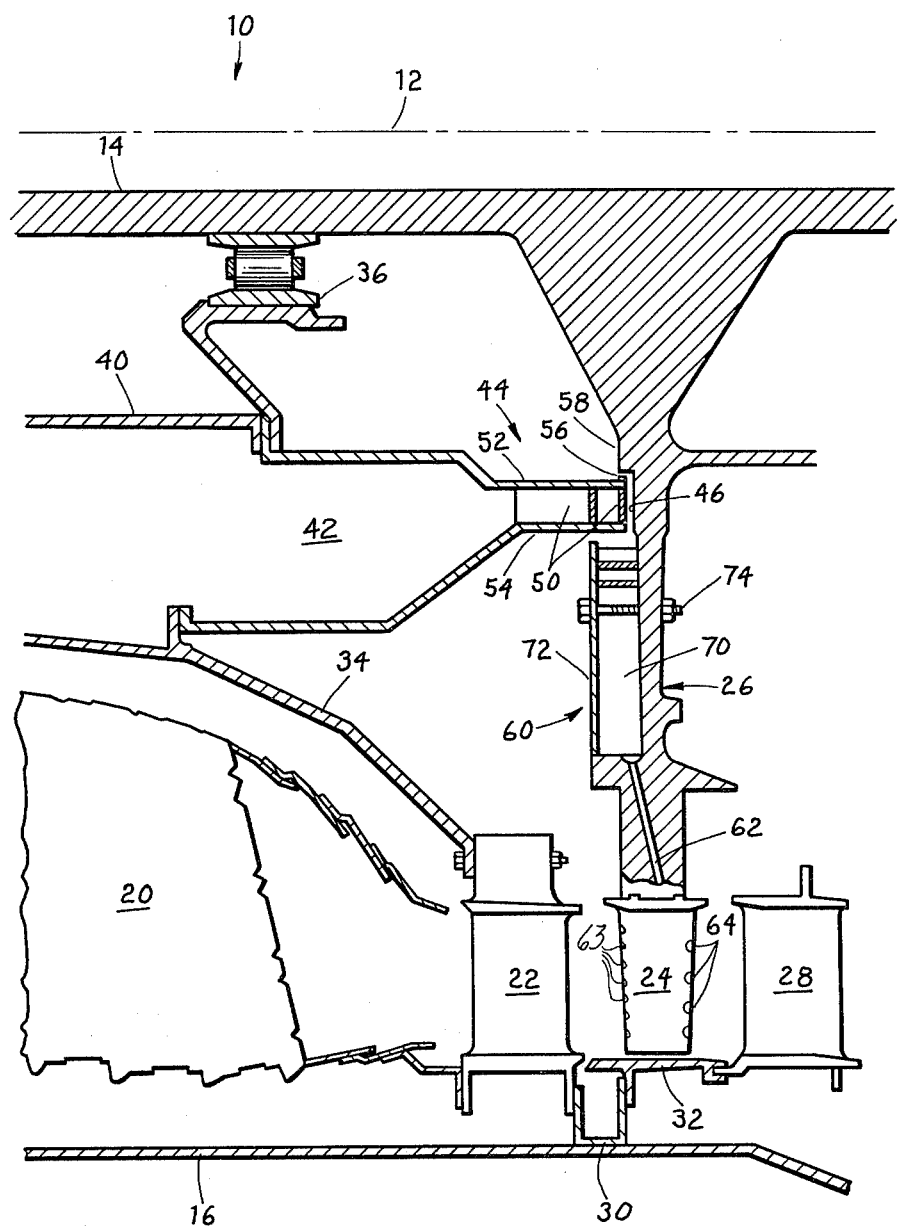
FIG. 1 is a fragmentary sectional view of a gas turbine engine at the junction of the combustion and turbine sections.

FIG. 1 illustrates the adjacent portions of a combustion section and a turbine section of a gas turbine engine generally designated 10. Since the engine is symmetrically constructed about the engine axis 12 and the turbine shaft 14, only the lower portion of the engine between the turbine shaft and the engine casing 16 is illustrated.

The combustion section has a plurality of burner cans 20 situated about the engine axis as shown and described in greater detail in U.S. Pat. No. 4,009,569 to Kozlin, and the cans collectively discharge hot gases into an annular array of stator vanes 22 at the inlet of the turbine section. The stator vanes 22 direct the gases at a relatively high velocity onto a plurality of rotor blades 24 mounted on the periphery of the rotor 26 in the first stage of the turbine section. From the blades 24, the gases are directed over a second annular array of stator vanes 28 and onto subsequent downstream stages (not shown) in the turbine section. Eventually, the gases are exhausted from the engine by way of diffuser or afterburner depending on the particular type of engine and its end use.

The stator vanes 22 and 28 are supported from the external casing 16 of the engine and also non-rotating structure within the engine. For example, the vanes 22 connect with the casing 16 by way of a bracket 30 which also supports a ring of members 32 defining the outer periphery of the gas flow path in the first stage of the turbine section. The radially inner ends of the vanes 22 are connected to the flange of a conical member 34 that is supported on the turbine shaft 14 by means of a shaft bearing 36 and intervening structure. The intervening structure includes the discharging end of a bleed conduit or manifold 40 connected at an upstream end (not shown) into the gas flow path through the compressor in a conventional manner. Air or other working medium ingested into the compressor section is bled from the flow path and is directed through the combustion section between the burner cans 20 by the conduit 40 to a station adjacent the turbine rotor 26. The discharge end of the conduit is comprised by an annular chamber or plenum 42 circumscribing the engine axis and receiving the bleed air at static pressures corresponding substantially to the discharge pressure from the compressor upstream of the burner cans 20.

A tangential accelerator is formed in the non-rotating environment in the annular discharge opening of the plenum 42 to accelerate the bleed air and turn the air in a direction tangent to an immediately adjacent annular region 46 in the rotating environment on the side of the rotor 26 facing the combustion section. The tangential accelerator is formed by a plurality of ribs 50 sandwiched between a radially inner ring or plate 52 and a radially outer ring or plate 54. As shown in FIG. 1, the inner plate 52 has a small ridge 56 which mates with a coresponding shoulder 58 on the rotor 26 to form a pollution seal preventing flow of gases between the inner and outer portions of the engine.

Figure 3:
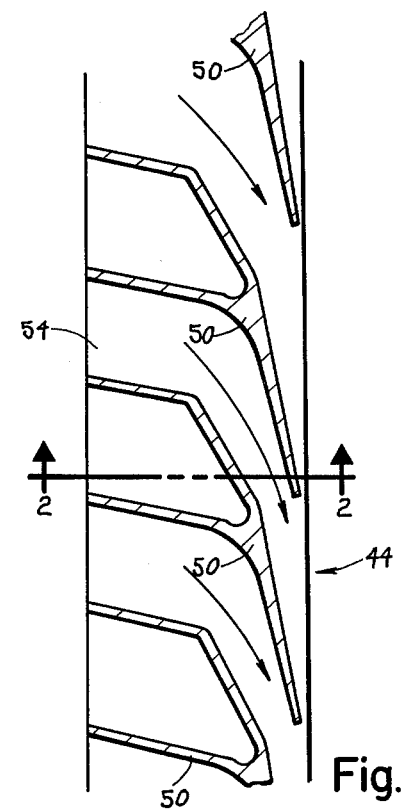
FIG. 3 is a sectional view of the tangential accelerator as seen along the sectioning line 3—3 in FIG. 2.

The ribs 50 of the tangential accelerator are shown most clearly in the sectional view of FIG. 3 and are bifurcated at the upstream ends in order to form an annular array of outlets or nozzles which accelerate and turn the air from the plenum 42 as indicated by the arrows. The ribs forming the outlets bend from generally axially extending upstream portions to generally tangentially extending portions at the exit, and converge in order to accelerate the air to a speed that is higher than the operating rotational speed of the rotor in the annular region 46. Thus, air exiting the tangential accelerator 44 passes along the adjacent face of the rotor with a positive relative velocity in the direction of rotation.

As shown in FIG. 1 a second conduit including a diffuser 60 is formed in the rotating environment of the rotor 26 between the tangential accelerator 44 and the rotor blades 24. The diffuser 60, described in greater detail below, pumps the bleed air discharged from the accelerator 44 radially outward along the rotor to a plurality of radially extending passageways 62 connecting with interior channels of the ventilated turbine blades 24. Channels within the turbine blades lead to orifices 63 along the leading edge or orifices 64 along the trailing edge of the blades so that the bleed air passes from the rotor through the passageways 62 and the blades 24 and exits from the blades into the hot stream of combustion gases passing through the turbine section from the burner cans 20. Since the bleed air is substantially cooler than the combustion gases, the air cools the turbine blades but may also serve other functions associated with the blades or the combustion and exhaust process.

Figure 2:
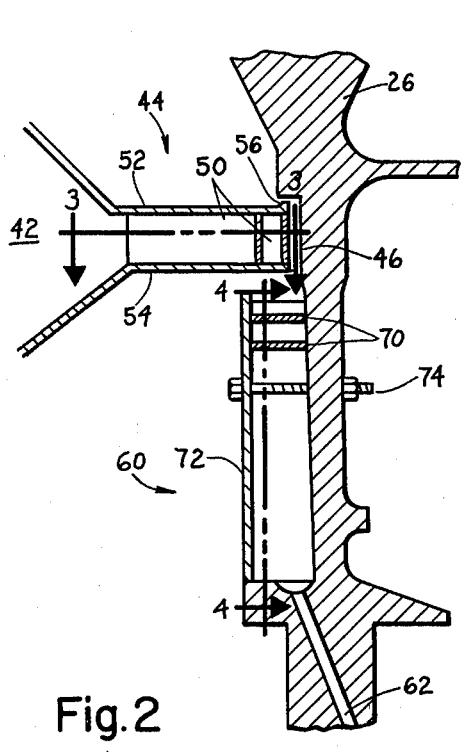
FIG. 2 is an enlarged fragmentary view of the tangential accelerator and the adjacent turbine rotor.
Figure 4:
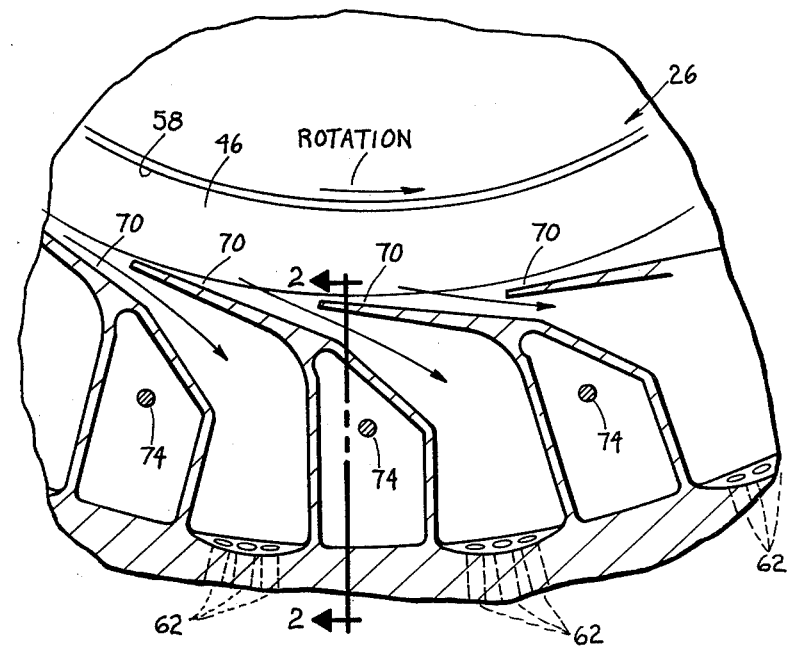
FIG. 4 is a sectional view of the diffuser mounted on the turbine rotor as seen along the sectioning line 4—4 in FIG. 2.

The diffuser 60 is comprised by a plurality of ribs 70 which form an annular series of tangential inlets on the rotor adjacent the annular region 46 and an annular side plate 72 which sandwiches the ribs 70 between the plate and the rotor 26. The side plate may be segmented for ease of installation, and the ribs 70 may be integrally connected or be bonded to the segments. The plates and ribs attached thereto are held in position on the side of the rotor by means of bolts 74 which extend through the plate and rotor as shown in FIGS. 1, 2 and 4.

At the inlets the ribs 70 extend generally tangentially of the annular region 46 in the direction of rotation and then divide into bifurcations which extend generally radially of the rotor toward the passageways 62. Since the air discharged by the tangential accelerator 44 has a higher velocity than the rotor in the region 46, the bleed air enters the inlets formed by the ribs 70 as indicated by the arrows in FIG. 4. Once inside of the inlets, the air is turned and diffused by the diverging cross-section of the passageways formed by the radially extending portion of the ribs so that increased pressures develop at the entrances to the passageways 62 connected to the turbine blades. It is an important feature of the present invention that the inlets of the diffuser extend in the tangential direction as illustrated and scoop the air moving at a higher velocity than the rotor into the diverging passageways. Such positioning of the inlets insures that the dynamic pressure or relative velocity of the moving air is recovered in the diffuser which in turn insures that the maximum possible static pressure is retained. Such pressure is further increased by the pumping action of the radially extending ribs which impel the air radially outward of the rotor as in a centrifugal pump.

Accordingly, the working medium or air bled from the compressor section of the engine is transmitted to the rotating environment of the turbine section by means of the tangential accelerator 44 and the diffuser 60 with little or no loss in static pressure. Recovery of the relative velocity of the air and the preservation of the static pressure by means of the diffuser 60 is important because the pressure of the combustion gases surrounding the ventilated turbine vanes 24 may be only slightly less than that of the discharge pressure of the compressor and, therefore, slight losses in the conduits ducting air from the flow path in the compressor may have a significant effect on the volume of air bled through the blades. The maintenance of static pressure along the flow path to the blades renders the system operational and efficient, and permits more accurate regulation of the cooling or other function performed by the bleed air.

While the present invention has been described in a preferred embodiment, it should be understood that numerous modifications and substitutions can be had without departing from the spirit of the invention. For example, the ribs 70 forming the diffuser between the plate 60 and the rotor 26 may be integrally connected to the rotor or bonded to the rotor rather than to the side plate 60. If desired, some of the bled medium within the diffuser 60 can be axially ducted through the first stage rotor 26 to second or third stage rotors down stream in the turbine section. Accordingly, the present invention has been described in a preferred embodiment by way of illustration rather than limitation.

I claim:

1. In a gas turine of the type having a compressor section having a flow path from which a fluid working medium such as air is discharged at an elevated pressure to a combustion section where the working medium is combined with a fuel in a combustion process and the products of combustion are directed at high velocity onto a plurality of turbine blades distributed about the periphery of a turbine rotor in a turbine section, improved apparatus for ducting the working medium to the plurality of turbine blades for cooling and other purposes comprising:

first conduit means receiving a portion of the working medium from the flow path in the compressor section and having a discharge end located adjacent the turbine rotor and forming a tangential accelerator discharging the working medium substantially tangentially of an annular region of the rotor in the direction of rotor rotation and at a higher velocity than the velocity of the rotor in the annular region at operating speed, whereby a relative velocity exists between the discharged working medium and the rotor, and the temperature of the working medium is reduced by the higher velocity for greater cooling effect, the accelerator including a plurality of tangentially directed outlets arranged in an annular array adjacent said annular region of the rotor; and second conduit means connected with the turbine rotor for rotation with the turbine blades and leading to the turbine blades at the periphery of the rotor, the second conduit means having inlets directed generally tangentially of the rotor and positioned radially outward from the outlets of the tangential accelerator and said annular region of the rotor at the same axial station as the accelerator outlets to receive the working medium discharged at high velocity from the tangential accelerator, the tangentially directed inlets connecting to a downstream portion of the second conduit means extending radially outward on the rotor from the annular region and having diverging walls forming diffusing means for diffusing the working medium received at the higher velocity and recovering the dynamic pressure of the working medium whereby static pressure is improved in the second conduit means.

2. In a gas turbine engine, the improved apparatus of claim 1 wherein the second conduit means is comprised by a plurality of ribs on the rotor forming an annular series of the tangential inlets adjacent said annular region of the rotor and leading from the inlets radially outward of the rotor.

3. In a gas turbine engine, the improved apparatus of claim 2 wherein the ribs of the second conduit means are sandwiched between the turbine rotor and a side plate attached to the rotor.

4. The apparatus of claim 3 wherein the side plate attached to the rotor is a segmented side plate and the ribs are integrally connected to the segments of the plate.

5. The improved apparatus of claim 1 wherein the tangential accelerator is comprised of a plurality of ribs forming the plurality of outlets and having portions extending generally in the tangential direction at the discharge openings of the outlets adjacent the rotor, and radially inner and outer plates sandwiching the ribs therebetween.

6. The improved apparatus of claim 5 wherein the ribs of the tangential accelerator also include portions upstream of the discharge openings extending generally axially of the rotor and joining the tangential portions near the discharge openings.

7. The improved apparatus of claim 6 wherein the second conduit means is comprised by a plurality of flow turning ribs disposed at one side of the rotor and extending at one end tangentially of the annular region of the rotor to form the tangential inlets and bending from the tangential to the radial direction for moving the medium to the blades at the periphery of the rotor.

* * * * *